(12) United States Patent
Werneth et al.

(10) Patent No.: US 6,435,550 B1
(45) Date of Patent: Aug. 20, 2002

(54) PYROTECHNICAL GAS GENERATOR

(75) Inventors: Josef Werneth, Ampfing; Horst Laucht, Bruckmühl, both of (DE)

(73) Assignee: TRW Airbag Systems GmbH & Co. KG, Aschau/Inn (DE)

( * ) Notice: Subject to any disclaimer, the term of this patent is extended or adjusted under 35 U.S.C. 154(b) by 0 days.

(21) Appl. No.: 09/994,214

(22) Filed: Nov. 26, 2001

(30) Foreign Application Priority Data

Nov. 27, 2000 (DE) .......................................... 200 20 103

(51) Int. Cl.$^7$ ................................................ B60R 21/26
(52) U.S. Cl. ............... 280/737; 102/202.5; 102/202.14; 102/531; 280/741
(58) Field of Search ................................. 280/741, 737; 102/530, 531, 202, 220.5, 202.12, 202.14

(56) References Cited

U.S. PATENT DOCUMENTS

| | | | |
|---|---|---|---|
| 3,858,392 A | * | 1/1975 | Evans et al. |
| 3,990,367 A | | 11/1976 | Smith |
| 4,959,011 A | | 9/1990 | Nilsson |
| 5,142,982 A | | 9/1992 | Diepold et al. |
| 5,879,025 A | * | 3/1999 | Blumenthal ................. 280/741 |
| 6,012,737 A | | 1/2000 | Van Wynsberghe et al. |
| 6,089,597 A | | 7/2000 | Leifheit et al. |
| 6,234,524 B1 | * | 5/2001 | Patrickson et al. ......... 280/741 |

* cited by examiner

*Primary Examiner*—Eric Culbreth
(74) *Attorney, Agent, or Firm*—Tarolli, Sundheim, Covell, Tummino & Skabo L.L.P.

(57) ABSTRACT

The invention relates to a pyrotechnical gas generator comprising a generator outer housing in which a pyrotechnical propellant charge and an igniter are accommodated. The igniter has its own self-contained igniter housing which contains a pyrotechnical material and is fastened to the generator outer housing. The igniter housing has a base part and a cap-shaped receiving part fastened thereto. The receiving part has a radial flange with an outer edge, the outer edge projecting radially with respect to the base part and being welded to the generator outer housing. The flange is welded to the base part.

7 Claims, 1 Drawing Sheet

PYROTECHNICAL GAS GENERATOR

TECHNICAL FIELD

The invention relates to a pyrotechnical gas generator.

BACKGROUND OF THE INVENTION

U.S. Pat. No. 5,957,492 shows a pyrotechnical gas generator comprising a generator outer housing in which a pyrotechnical propellant charge and an igniter are accommodated, the igniter having its own self-contained igniter housing which contains a pyrotechnical material and is fastened to the generator outer housing, and the igniter housing having a base part and a cap-shaped receiving part fastened thereto. The igniter, constructed as a separate, preassembled unit, is inserted with its outer housing into an opening in a cover of the generator outer housing and is preferably fastened to the cover by means of laser welding. Laser welding, however, is very expensive as a process and is only successful when very small component tolerances are maintained. A further disadvantage of the laser welding which is provided consists in that the so-called glass/metal passage, namely the passage of electric connections through the igniter housing via openings in the igniter housing, which are potted with glass, is highly stressed thermally by the laser welding.

The solution in DE 196 01 448 A1 also has similar disadvantages, in which, however, the igniter is not constructed as a separate part with a self-contained gas-tight and moisture-tight housing, but rather in which two cup-shaped housing parts are inserted one into another and are welded to the same base. The outer housing is a part of the combustion chamber housing and the inner housing is a part of the igniter housing. The manufacture of this gas generator is costly, because the igniter is not able to be transported separately, but rather the pyrotechnical material together with the connecting lines is only filled into the corresponding receiving containers on manufacture of the entire gas generator. Therefore, also, the igniter can not be constructed as a separate supplied part.

DE 195 33 606 A1 shows a gas generator in which the base part has a radial flange which is welded to the generator outer housing. The base part has a cylindrical section, over which a receiving part is turned and is fastened to it. In this gas generator, the base part must be precisely machined at the various sections in order to permit a gas-tight welding. The welding in the region of the cylindrical section is, furthermore, provided close to the passage for the electric connections, so that the thermal stress of the material of the passage by welding is high.

BRIEF SUMMARY OF THE INVENTION

The invention provides a gas generator which can be manufactured simply and in which the thermal stress of the entire igniter during welding to the generator outer housing is reduced. This is achieved in a pyrotechnical gas generator which comprises a generator outer housing in which a pyrotechnical propellant charge and an igniter are accommodated. The igniter has its own self-contained igniter housing which contains a pyrotechnical material and is fastened to the generator outer housing. The igniter housing has a base part and a cap-shaped receiving part fastened thereto. The receiving part has a radial flange with an outer edge, the outer edge projecting radially with respect to the base part and being welded to the generator outer housing. The flange is welded to the base part.

In the gas generator proposed, the receiving part has a flange which projects radially and hence acts as a heat-emitting rib, whereby the thermal stress in the region of the base part is reduced. The flange is welded on the one hand to the base part and on the other hand, in the region of its outer edge, to the generator housing. Consequently, a precise machining for welding which is to be carried out is only necessary in the region of the flange and not at several sections of the igniter housing. The receiving part therefore serves not only to accommodate the pyrotechnical material for the igniter, but also for sealing the generator outer housing, because the igniter is usually inserted into an opening in the generator outer housing.

The preferred embodiment makes provision that the base part has a radially projecting counter-flange against which the flange of the receiving part lies. The flange and the counter-flange therefore form a surrounding, radially projecting, heat-dissipating rib, which on contact with the generator outer housing makes available a large surface area for a direct heat transfer to the generator outer housing during welding.

Preferably, the welding on the outer edge of the gas generator is gas-tight and moisture-tight, so that no additional seals are provided in the region of the igniter for closing the opening in the generator outer housing.

Welding the outer edge with the generator outer housing preferably takes place by capacitor discharge welding, a welding process in which usually the two parts which are to be welded to each other are also pressed firmly against each other. Through the provision of the flange and preferably of the counter-flange, the danger does not exist that parts are deformed through the application of pressure during welding.

In addition, provision is preferably made that the outer edge lies with its entire surface against the inner face of the cover, so that the igniter housing does not project outwards with respect to the generator outer housing.

DETAILED DESCRIPTION OF THE PREFERRED EMBODIMENT

Figure 1:
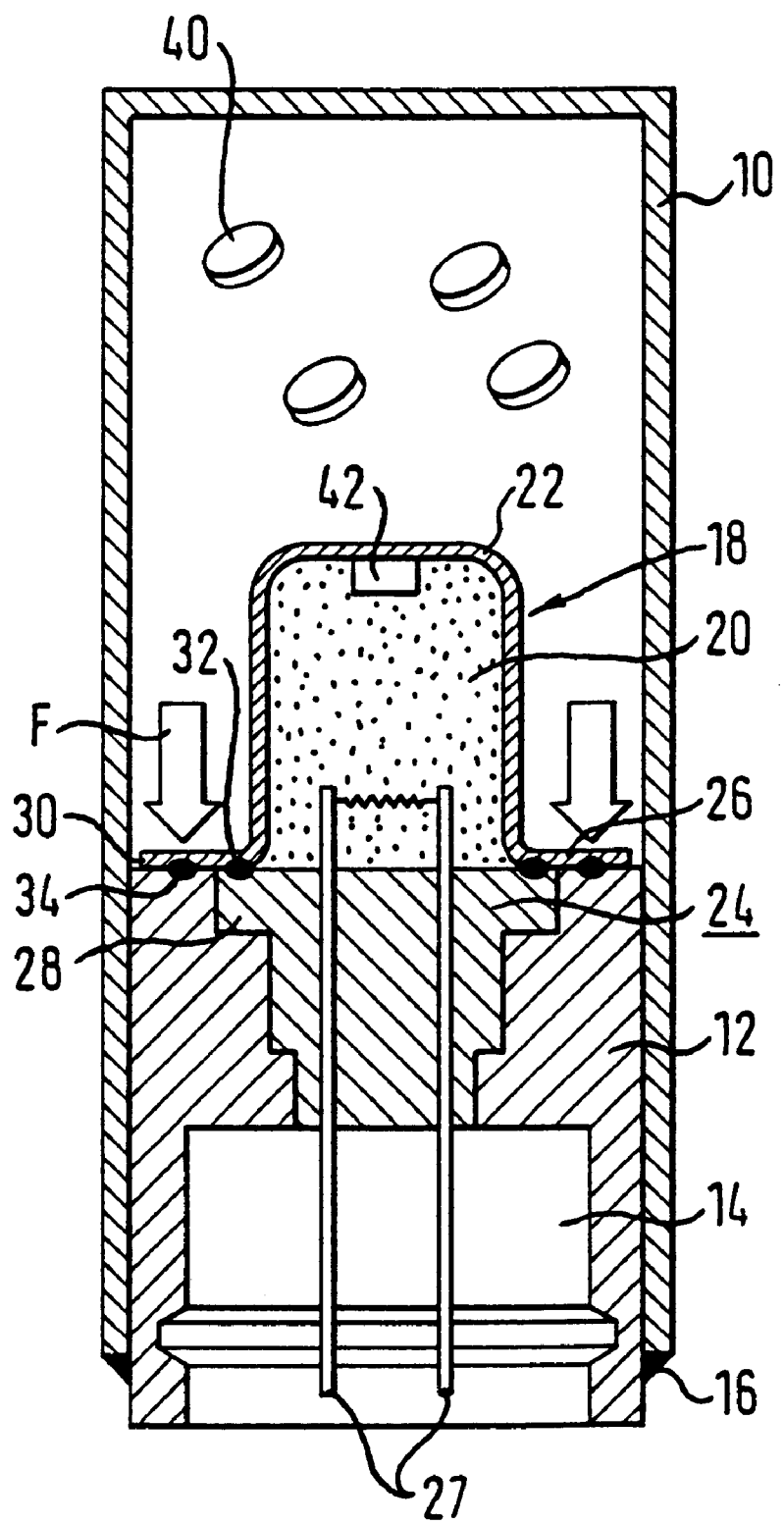
FIG. 1 shows a longitudinal section through an embodiment of the gas generator according to the invention.

The gas generator has a generator outer housing, consisting of a cup-shaped part 10 of deep-drawn sheet metal and of a cover 12 with an opening 14 having several shoulders. The generator outer housing is constructed so as to be gas-tight and moisture-tight, more precisely even helium-tight, so that no moisture can penetrate into the interior of the generator outer housing for more than ten years. For this, the part 10 is fastened to the cover 12 for example by means of a weld seam 16, separate seals also being able to be provided in addition between the two parts.

An igniter 18, constructed as a separately transportable unit, is inserted into the opening 14 from inside, i.e. before the part 10 is put in place. The igniter has its own self-contained igniter housing, which is likewise constructed so as to be helium-tight and moisture-tight. Pyrotechnical material 20 and an advance ignition charge 42 are accommodated inside the igniter housing. The igniter housing consists of a cap-shaped receiving part 22 of thin sheet metal, for example stainless steel, receiving the pyrotechnical material 20, and of a base part 24, through which electric connections 27 are guided for activating the igniter.

Facing the base part 24, the receiving part 22 has a surrounding flange 26 which projects radially outwards. In the region of the flange 26, the base part 24 has a likewise radially projecting, surrounding counter-flange 28. The counter-flange 28, however, has a smaller diameter, so that the flange 26 has an outer edge 30 which is to be that region of the flange which projects radially with respect to the counter-flange 28.

Where the flange 26 and the counter-flange 28 lie against each other with their entire surfaces, the receiving part 22 and the base part 24 are connected with each other by capacitor discharge welding so as to be gas-tight and protected from the entry of moisture. The corresponding surrounding weld seam is designated by 32. A second weld seam 34 connects the outer edge 30, which lies with its entire surface directly against the cover 12, with the cover 12.

Also the weld seam 34 is produced by capacitor discharge welding. Through the over-sized flange 26, the receiving part 22 serves not only as a section of the igniter housing, but also as a seal of the opening 14 of the generator outer housing.

The production of the illustrated gas generator is described below.

The igniter, as a separate closed unit, is usually delivered to the generator manufacturer by a supplier and, because it is a closed housing, it can also be stored in an in-process inventory. The igniter is placed onto the cover 12 from above, in relation to FIG. 1, and is permanently fastened to the cover 12 by capacitor discharge welding, an axial pressure also being exerted onto the flange 26 during capacitor discharge welding, as symbolized by the arrows F. Through this pressure, the flange 26 is pressed against the cover 12.

Parallel to this, a pyrotechnical propellant charge, for example a propellant charge 40 in tablet form, is introduced into the cup-shaped part 10, the later shape of the igniter 18 preferably being recessed out by a so-called dummy. Then the cover 12 and cup-shaped part 10 are inserted one into another and are welded to each other. An additional seal between the igniter 18 and the cover 12 can be dispensed with in the illustrated embodiment.

The following advantages of production of the gas generator are to be emphasized:

A capacitor discharge welding is a rapid and favorably-priced welding process which does not require any close component tolerances.

Few components are necessary for the gas generator, owing to the connecting of the igniter to the cover.

The contacting and pressing of the flange to the cover can take place in one operating step and in one tool.

The thermal stress of the passage of the electric contacts through the base part 24 is small. The glass/metal passage possibly provided, which in fact is not shown but which may be used, is therefore exposed to fewer stresses.

The connecting of the receiving part to the generator outer housing has a large area and is direct. As an advance ignition charge 42 is contained in the igniter, which charge 42 is activated in the case of a thermal stress of the generator outer housing, the gas generator according to the invention has excellent advance ignition characteristics, because the heat in the generator outer housing is transferred rapidly and directly to the igniter housing and hence to the advance ignition charge 42.

What is claimed is:

1. A pyrotechnical gas generator, comprising a generator outer housing in which a pyrotechnical propellant charge and an igniter are accommodated, said igniter having its own self-contained igniter housing which contains a pyrotechnical material and is fastened to said generator outer housing, and said igniter housing having a base part and a cap-shaped receiving part fastened thereto, said receiving part having a radial flange with an outer edge, said outer edge projecting radially with respect to said base part and being welded to said generator outer housing, and said flange being welded to said base part.

2. The gas generator according to claim 1, wherein said base part has a radially projecting counter-flange to which said flange of said receiving part is welded.

3. The gas generator according to claim 1, wherein said welding of said outer edge and said generator outer housing is made so as to be gas-tight and moisture-tight.

4. The gas generator according to claim 1, wherein said outer edge is fastened to said generator outer housing by capacitor discharge welding.

5. The gas generator according to claim 1, wherein said generator outer housing has a cup-shaped part and a cover closing the latter, said cover having an opening for connections of said igniter to be passed through, and said receiving part being welded to said cover and closing said opening.

6. The gas generator according to claim 5, wherein said outer edge lies with its entire surface against an inner face of said cover.

7. The gas generator according to claim 1, wherein said igniter has an advance ignition charge.

* * * * *